Jan. 5, 1954
L. H. THOMAS
2,665,365
ELECTRICALLY HEATED TOOL
Filed March 27, 1950
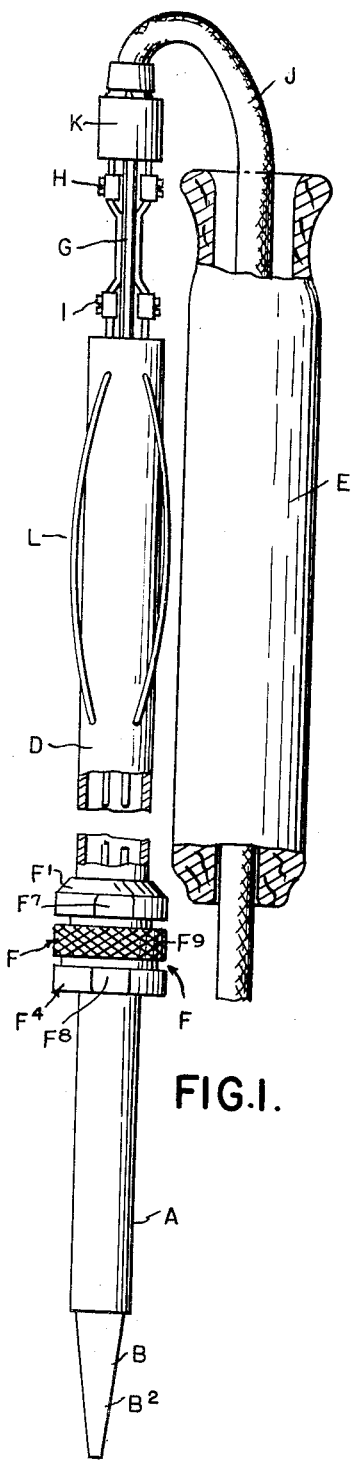
FIG.I.
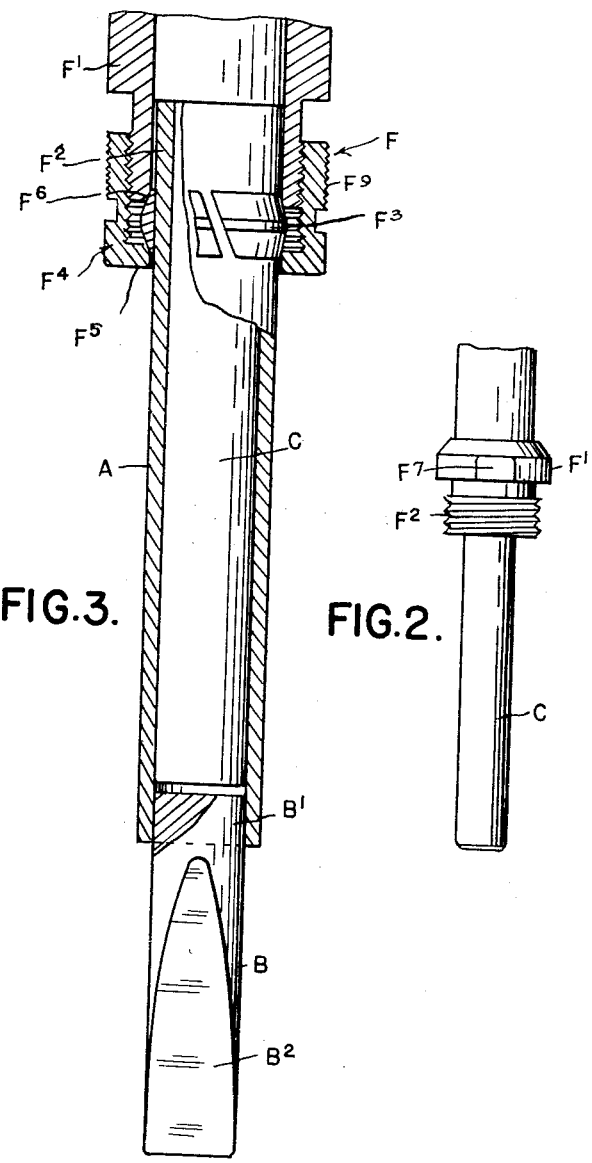
FIG.3.
FIG.2.
*INVENTOR.*
LAURENCE H. THOMAS
BY
*Whittemore Hulbert + Belknap*
ATTORNEYS Patented Jan. 5, 1954

2,665,365

UNITED STATES PATENT OFFICE 2,665,365

ELECTRICALLY HEATED TOOL

Laurence H. Thomas, Birmingham, Mich., assignor to American Electrical Heater Company, Detroit, Mich., a corporation of Michigan Application March 27, 1950, Serial No. 152,113

3 Claims. (Cl. 219—26)

The invention relates to electrically heated tools of the type including soldering irons, and it is the object of the invention to obtain a construction having various advantageous features as hereinafter set forth.

More particularly it is one of the objects of the invention to reduce the weight of the tool without loss of efficiency.

It is another object to obtain a construction which can be manufactured at relatively low cost.

Still further it is an object to obtain a construction in which the heating unit is separate from the portion of the tool to which the heat is applied so as to permit of readily exchanging the latter.

With these and other advantageous features in view, the invention consists in the construction as hereinafter set forth.

In the drawings:

Fig. 1 is an elevation of the electrically heated tool partly in section and showing the handle disengaged from the tool shank;

Fig. 2 is an elevation of the portion of Fig. 1 showing the heating unit but with the heat receiving element removed;

Fig. 3 is an enlarged longitudinal section showing a portion of the shank of the tool, the heating element, the elements to be heated thereby and the coupling for connecting these elements to the shank.

Fig. 1 shows my improved electrically heated tool as specifically designed for a soldering iron. It comprises generally a tubular heat-receiving member A having secured to its lower end the tool point B. The heating element C is of the cartridge type and is adapted to closely fit within the tube A. There is also a shank member D through which the electrical connections to the unit extend, a handle E surrounding the upper portion of said shank and a coupling F for connecting the lower end of the shank with the tube A. The arrangement is such that the cartridge unit extends downward below the lower end of the shank and the coupling F and can be readily engaged by the member A, which latter is secured to the shank by the coupling F.

The tubular member A which constitutes the heat-receiving element is preferably formed of copper, copper alloy or other suitable material relatively high in thermal conductivity. The tip or tool proper B has a cylindrical portion B' which extends into the lower end portion of the tube A and is brazed thereto. The lower portion B² of the tip is tapered and is of a form generally used for soldering irons. The unit C is cylindrical in form to closely fit within the tube A and is of a type sometimes called a cartridge unit, but its specific construction is not illustrated as this forms no part of the instant invention. The shank D is a straight tube formed of material which is lower in thermal conductivity than copper such, for instance, as stainless steel. Secured to the upper end portion of this tube to extend diametrically thereacross is a plate G which extends upward beyond the tube. Mounted on the upwardly extending portion and insulated therefrom are electrical connectors H, which at their lower ends have attached thereto insulated conductors I, extending through the tube and at their lower ends connecting to the cartridge unit C. The upper portions of the connectors H are coupled to the conductors of the flexible service connection J. There is, however, a strain member K mounted on the upper end of the plate G with which the strands of the service connection are engaged to relieve the electrical connections from stress. The handle E, which is made of insulating material, is sleeved over the upper portion of the shank D and also receives therein the plate G and connections. Spring members L mounted on the shank D serve to frictionally engage the handle and hold it in position.

The tip member B and tube A to which it is attached form an exchangeable unit which can be easily attached to or detached from the shank member D. The attaching means comprises a collar member F' directly secured to the shank D and having a threaded downward extension F² of smaller external diameter and of an internal diameter to receive the tubular member A. A split sleeve F³ is externally engaged with the member A, said sleeve having oppositely tapering end portions. F⁴ is an internally threaded member for engaging the threaded portion F² and having a radially inwardly extending flange F⁵ for bearing upon the lower tapered end of the sleeve F³. The upper tapered end of this sleeve engages a bearing F⁶ on the member F², and the construction is such that, by screwing the member F⁴ upon the member F², the flange F⁵ and bearings F⁶ will be clamped upon the tapered portions of the sleeve clamping the latter to the tube A. This will hold the tube A in alignment with the tube D and will rigidly secure the two members to each other. However whenever it is desired to exchange the members A and B, or in case the unit C should become inoperative, the tube A may be released by unscrewing the coupling F.

The collar F' and member F⁴ preferably have polygonal portions F⁷ and F⁸ forming wrench holds and there is also a knurled portion F⁹ on the member F⁴. The latter may be used for tightening the clamp but greater force may be required to unclamp when a tip is to be exchanged after long service requiring the use of wrenches.

What I claim as my invention is:

1. In a soldering iron of the type using an electrical heating unit, a handle member having a tubular shank and an exchangeable tool member comprising, a tip having a plain hollow thin walled cylindrical portion for receiving the electrical heating unit, the external diameter of which is sufficiently less than the internal diameter of the tubular shank to loosely telescopically engage the latter with the adjacent surfaces out of contact so as to avoid adhesion thereof by corrosion of the adjacent surfaces, and means on the portion of said shank directly surrounding said cylindrical portion for rigidly clamping said cylindrical portion without distortion of the same.

2. The construction as in claim 1 in which the clamping means includes a split collar sleeved on the cylindrical portion and externally tapered, and a clamping nut threadedly engaging said shank and having a portion for engaging said tapered collar.

3. The construction as in claim 2 in which said tubular shank and said clamping nut have polygonal portions forming wrench holds.

LAURENCE H. THOMAS.

References Cited in the file of this patent

UNITED STATES PATENTS

| Number | Name | Date |
|---|---|---|
| 786,542 | Brown et al. | Apr. 4, 1905 |
| 929,473 | Nilsson et al. | July 27, 1909 |
| 979,904 | Waage et al. | Dec. 27, 1910 |
| 1,608,949 | Mason | Nov. 30, 1926 |
| 1,970,642 | Batchelder | Apr. 21, 1934 |
| 2,014,567 | Hazlett et al. | Sept. 17, 1935 |
| 2,167,389 | Kuhn et al. | July 25, 1939 |
| 2,179,818 | Hampton et al. | Nov. 14, 1939 |
| 2,187,880 | Kaysing | Jan. 23, 1940 |
| 2,198,877 | Kuhn et al. | Apr. 30, 1940 |
| 2,213,438 | Young | Sept. 3, 1940 |
| 2,221,422 | Kuehl | Nov. 12, 1940 |
| 2,224,583 | Abbott | Dec. 10, 1940 |
| 2,341,938 | Mestitz | Feb. 15, 1944 |
| 2,346,327 | Pfeiffer | Apr. 11, 1944 |
| 2,456,030 | Sohns | Dec. 14, 1948 |
| 2,561,648 | Bradley | July 24, 1951 |

FOREIGN PATENTS

| Number | Country | Date |
|---|---|---|
| 578,501 | Great Britain | July 1, 1946 |